United States Patent
Reddy et al.

(10) Patent No.: US 10,469,453 B2
(45) Date of Patent: Nov. 5, 2019

(54) GRANULAR OFFLOADING OF A PROXIED SECURE SESSION

(71) Applicant: Juniper Networks, Inc., Sunnyvale, CA (US)

(72) Inventors: Khandi Sudhakar Reddy, Bangalore (IN); Rajeev Chaubey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 178 days.

(21) Appl. No.: 15/429,734

(22) Filed: Feb. 10, 2017

(65) Prior Publication Data

US 2018/0234388 A1   Aug. 16, 2018

(51) Int. Cl.
*G06F 21/00* (2013.01)
*H04L 29/06* (2006.01)

(52) U.S. Cl.
CPC ...... *H04L 63/0281* (2013.01); *H04L 63/0227* (2013.01); *H04L 63/0464* (2013.01); *H04L 63/061* (2013.01); *H04L 63/306* (2013.01); *H04L 63/0428* (2013.01); *H04L 2209/76* (2013.01)

(58) Field of Classification Search
CPC . H04L 63/0281; H04L 63/061; H04L 63/306; H04L 63/0464; H04L 63/0227; H04L 63/0428; H04L 2209/76
USPC ........................................................ 713/153
See application file for complete search history.

(56) References Cited

U.S. PATENT DOCUMENTS

| 7,778,194 | B1 * | 8/2010 | Yung | H04L 41/0896 |
| | | | | 370/235 |
| 2010/0228962 | A1 * | 9/2010 | Simon | H04L 63/0428 |
| | | | | 713/150 |
| 2012/0290829 | A1 * | 11/2012 | Altman | H04L 63/1416 |
| | | | | 713/150 |
| 2013/0133032 | A1 * | 5/2013 | Li | H04L 63/0281 |
| | | | | 726/3 |
| 2014/0140213 | A1 * | 5/2014 | Raleigh | H04L 67/2804 |
| | | | | 370/235 |
| 2014/0351573 | A1 * | 11/2014 | Martini | H04L 63/0428 |
| | | | | 713/153 |
| 2015/0113264 | A1 * | 4/2015 | Wang | H04L 63/0823 |
| | | | | 713/151 |

FOREIGN PATENT DOCUMENTS

EP   2528299 A1   11/2002

OTHER PUBLICATIONS

Extended European Search Report corresponding to EP 17168623.1 dated Nov. 20, 2017, 9 pages.

* cited by examiner

*Primary Examiner* — Mohammad W Reza
*Assistant Examiner* — Kevin Ayala
(74) *Attorney, Agent, or Firm* — Harrity & Harrity, LLP

(57) ABSTRACT

A device may receive encrypted traffic associated with a secure session. The device may determine, based on the encrypted traffic, information associated with an offload service to be applied to the encrypted traffic associated with the secure session. The information associated with the offload service may indicate whether the encrypted traffic is permitted to bypass inspection by one or more security services. The device may selectively permit the encrypted traffic, associated with the secure session, to bypass inspection by the one or more security services based on the information associated with the offload service.

20 Claims, 8 Drawing Sheets

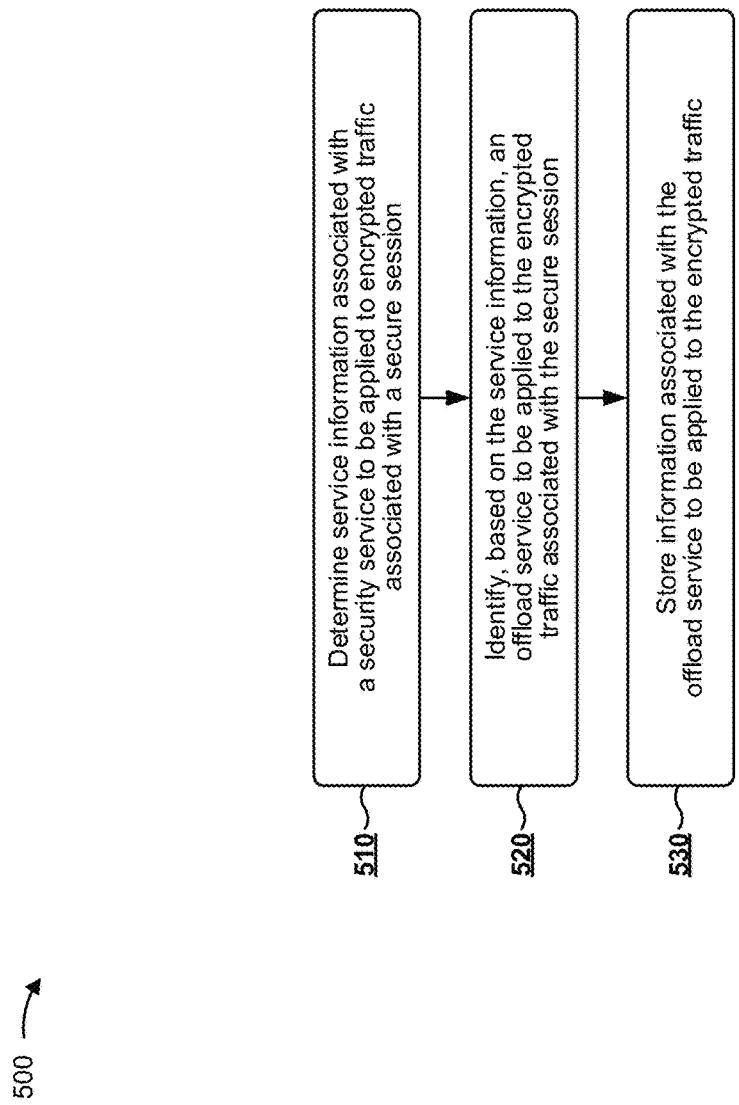

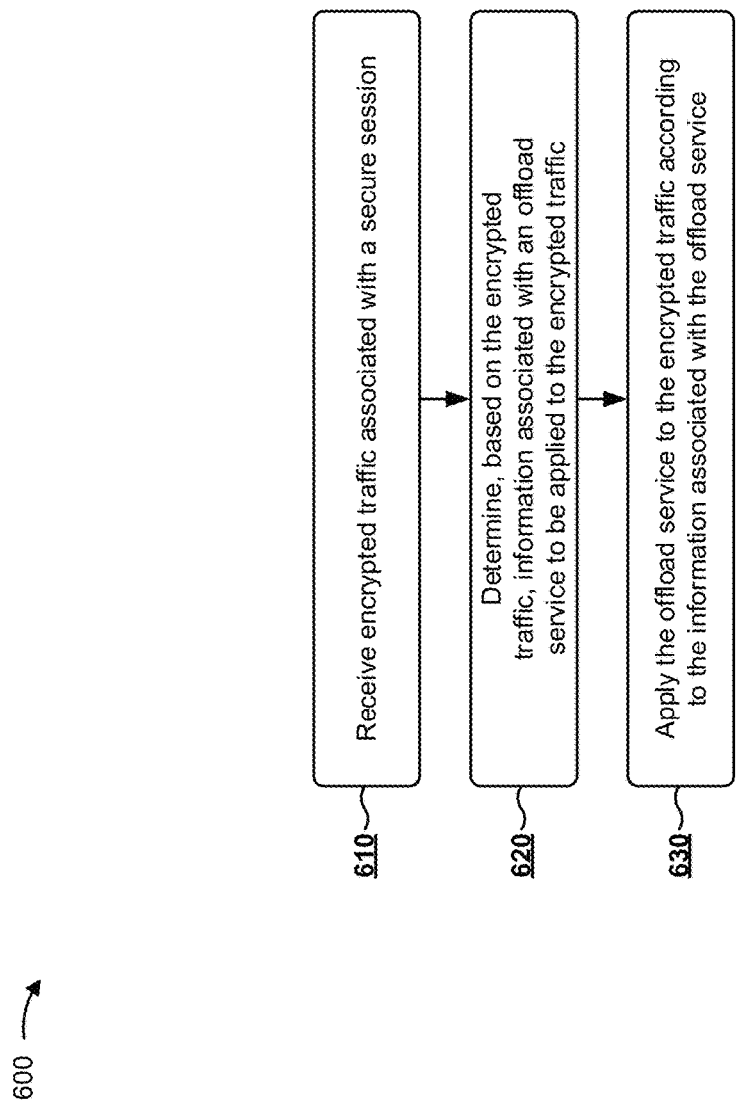

GRANULAR OFFLOADING OF A PROXIED SECURE SESSION

BACKGROUND

Transport Layer Security (TLS) and its predecessor, Secure Sockets Layer (SSL) (sometimes both referred to as SSL) are cryptographic protocols that provide secure communication over a network. For example, TLS may provide privacy and data integrity for traffic associated with an application, such as a web browsing application, an email application, an instant messaging application, a voice-over-IP (VoIP) application, or the like.

SUMMARY

According to some possible implementations, a device may include one or more processors to: receive encrypted traffic associated with a secure session; determine, based on the encrypted traffic, information associated with an offload service to be applied to the encrypted traffic associated with the secure session, where the information associated with the offload service may indicate whether the encrypted traffic is permitted to bypass inspection by one or more security services; and selectively permit the encrypted traffic, associated with the secure session, to bypass inspection by the one or more security services based on the information associated with the offload service.

According to some possible implementations, a non-transitory computer-readable medium may store instructions that, when executed by one or more processors, cause the one or more processors to: receive encrypted traffic associated with a secure session; identify, based on the encrypted traffic, an offload service to be applied to the encrypted traffic associated with the secure session, where the offload service may indicate whether the encrypted traffic is permitted to be forwarded without inspection by one or more security services; and selectively forward the encrypted traffic, without inspection by the one or more security services, based on the offload service.

According to some possible implementations, a method may include: determining, by a device, service information associated with one or more security services to be applied to encrypted traffic associated with a secure session, where the service information may identify a manner in which the one or more security services need to access the encrypted traffic in order to apply the one or more security services; identifying, by the device and based on the service information, an offload service to be applied to the encrypted traffic, where the offload service may indicate whether the encrypted traffic is permitted to bypass inspection by the one or more security services; receiving, by the device, the encrypted traffic associated with the secure session; and selectively permitting, by the device and based on the offload service and information included in the encrypted traffic, the encrypted traffic to bypass inspection by the one or more security services.

BRIEF DESCRIPTION OF THE DRAWINGS

FIG. 5 is a flow chart of an example process for identifying an offload service to be applied to encrypted traffic associated with a secure session; and FIG. 6 is a flow chart of an example process for applying an offload service to encrypted traffic associated with a secure session.

DETAILED DESCRIPTION

Figure 1A:
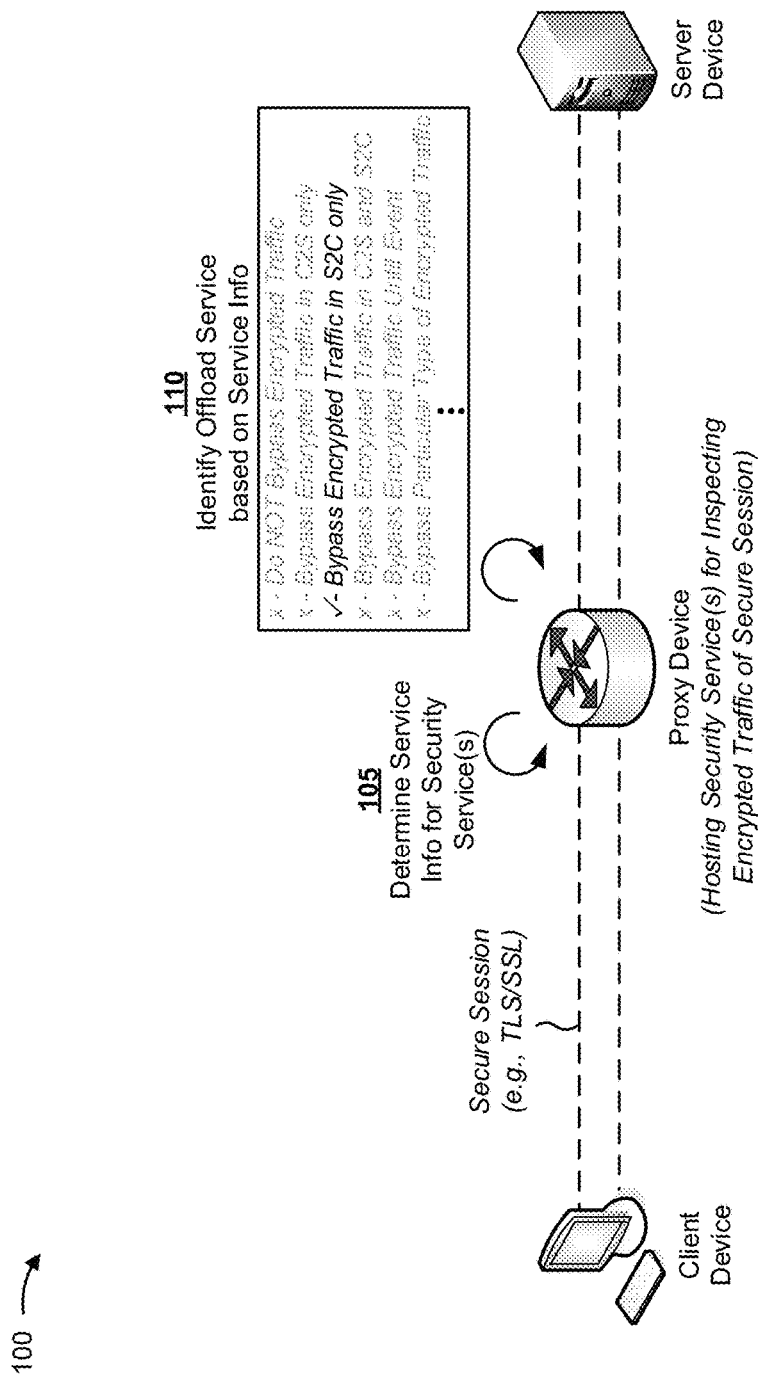
FIG. 1A-1C are diagrams of an overview of an example implementation described herein.

The following detailed description of example implementations refers to the accompanying drawings. The same reference numbers in different drawings may identify the same or similar elements.

An attacker may use TLS/SSL traffic (herein referred to as encrypted traffic), associated with a TLS/SSL session (herein referred to as a secure session) to hide a security threat. In order to combat this problem, a network security device may act as a TLS/SSL proxy device (herein referred to as a proxy device) in order to inspect the encrypted traffic for security threats.

Here, the proxy device may decrypt the encrypted traffic (e.g., travelling from a client device to a server device or from the server device to the client device), and apply one or more security services to the decrypted traffic in order to check for a security threat. After the one or more security services have been applied, the proxy device may re-encrypt the traffic and forward the re-encrypted traffic to the appropriate destination. In other words, the proxy device may need to decrypt and then re-encrypt the encrypted traffic before forwarding.

However, such operation may result in usage of a significant amount of processor resources by the proxy device (e.g., since decryption and re-encryption of the traffic may be processor intensive). Moreover, since the proxy device needs to perform double the amount of crypto-operations (e.g., decryption followed by re-encryption) as compared to the client device and/or the server device, scaling and performance of the proxy device may be poor.

Furthermore, for a given secure session where the proxy device is positioned between the client device and the server device, the proxy device may need to continue with the decryption/re-encryption process until the end of the secure session, even when there is no need for further inspection of the encrypted traffic, which may result in wasted usage of processor resources and/or inefficient operation of the proxy device. Further, as a performance of the proxy device may be significantly less than a security service (e.g., throughput of the proxy device may be a few orders of magnitude less than a throughput of a firewall), any improvement in performance of the proxy device may improve performance of and/or increase efficacy of the security service.

Implementations described herein provide a proxy device capable of dynamically offloading a secure session in a granular manner based on information associated with one or more security services to be applied to encrypted traffic of the secure session.

For example, the proxy device may dynamically offload the secure session by bypassing (e.g., forwarding without decrypting, inspecting, and re-encrypting) data messages, included in the encrypted traffic, until a particular amount data has bypassed inspection.

As another example, the proxy device may dynamically offload the secure session by bypassing data messages, included in the encrypted traffic, travelling in a particular direction (e.g., client-to-server (C2S), server-to-client (S2C)), while continuing to inspect control messages included in the encrypted traffic (e.g., handshake messages, or the like) travelling in the particular direction.

As still another example, the proxy device may dynamically offload the secure session by bypassing data messages travelling in any direction, until the proxy device detects a particular event (e.g., a renegotiation of the secure session).

As yet another example, the proxy device may dynamically offload the secure session by bypassing all of the encrypted traffic when, for example, the one or more security services are finished inspecting the secure session (e.g., according to a configuration of the one or more security services). Here, the secure session may be entirely offloaded (e.g., to hardware of the network security device) such that the proxy device does not process or forward the encrypted traffic.

Accordingly, implementations described herein permit a granular offload of a proxied secure session, without compromising the efficacy of one or more security services. Such offloading may allow for increased performance of the proxy device through more efficient use of processor resources and/or by reducing the actual use of processor resources.

Figure 1B:
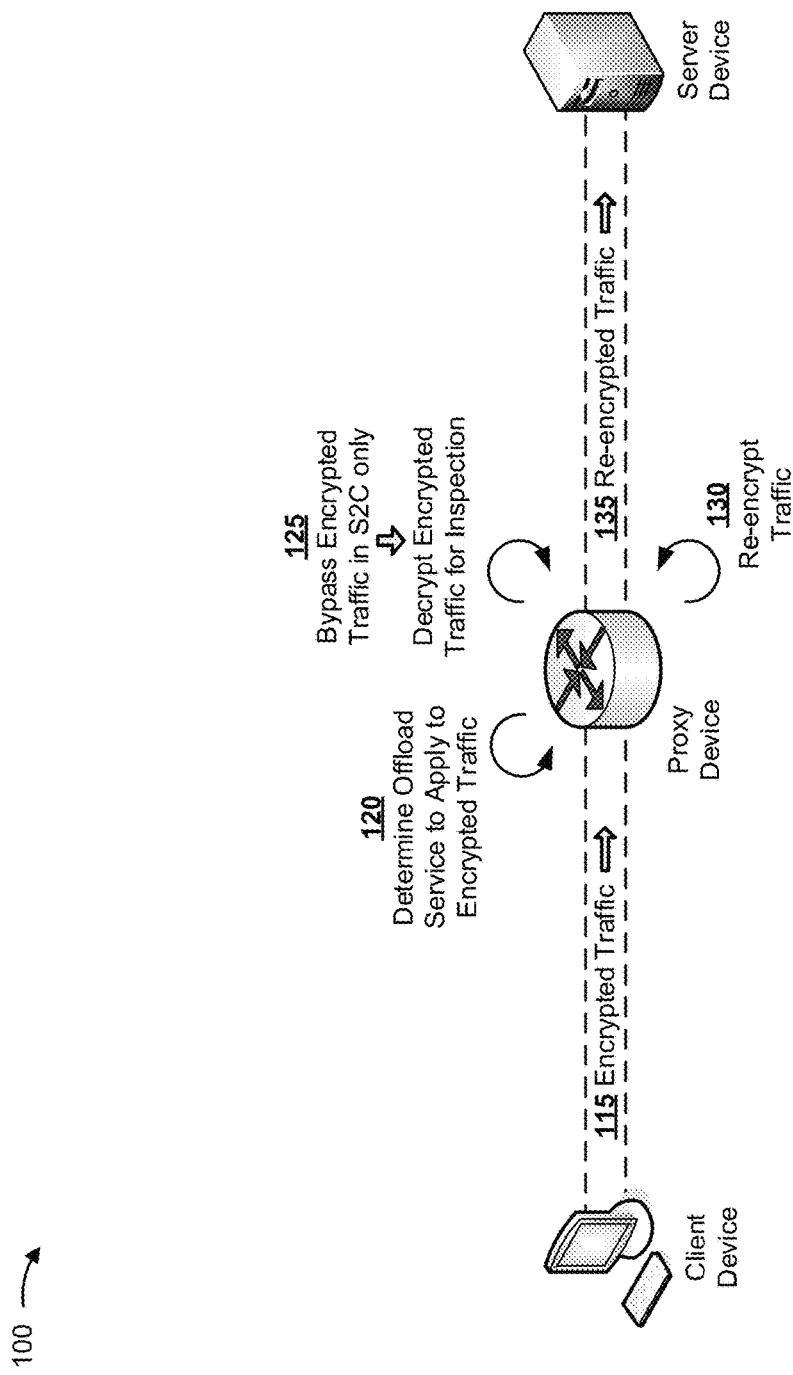
Figure 1C:
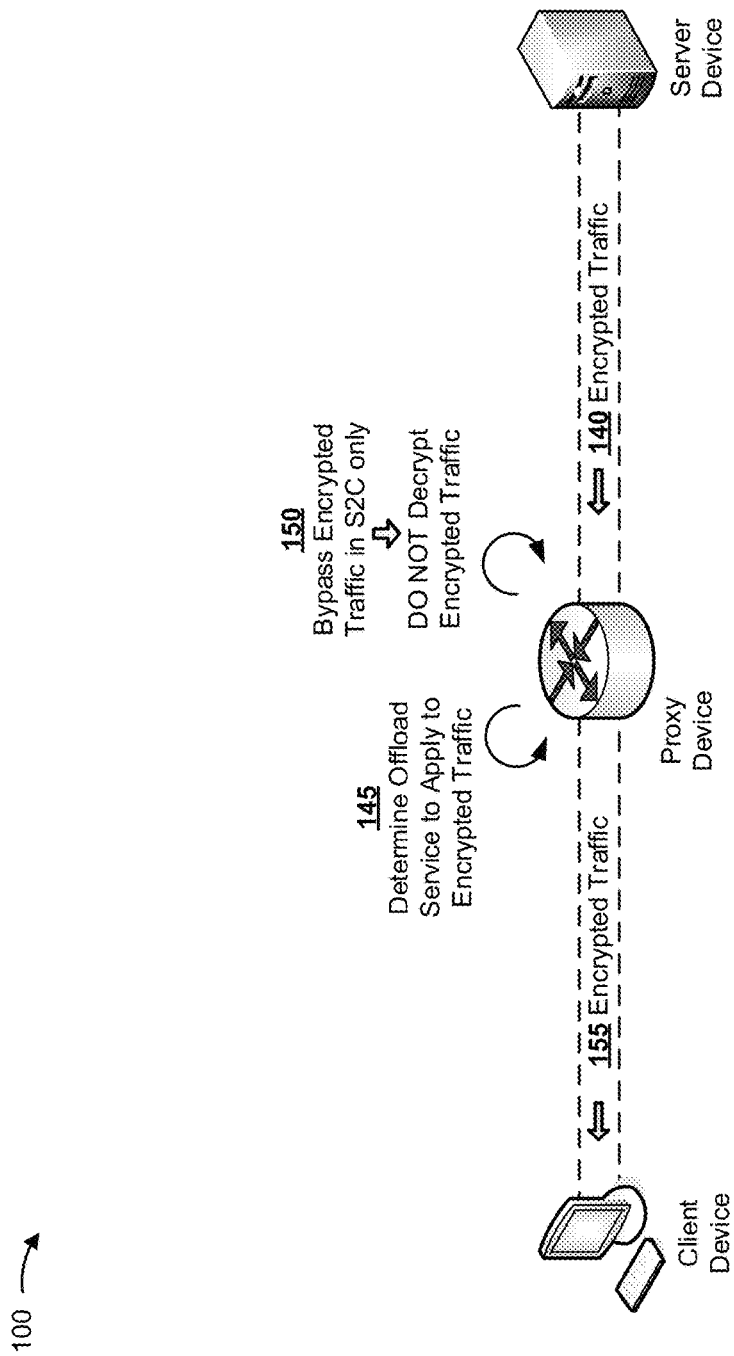

FIG. 1A-1C are diagrams of an overview of an example implementation 100 described herein. FIG. 1A depicts a client device, a server device, and a proxy device in an example secure session for securing communications between the client device and the server device, with the proxy device positioned between the client device and the server device. In this example, the proxy device hosts one or more security services for inspecting the encrypted traffic of the secure session. At reference number 105, the proxy device determines service information associated with the one or more security services to be applied to the encrypted traffic associated with the secure session.

The service information may include information associated a security service to be applied to the encrypted traffic, including information that identifies a level of access to the encrypted traffic that is needed by the security service in order to apply the security service. The service information may, for example, include information that identifies the security service, a type of data to be inspected, a particular amount of data to be inspected, a direction of traffic to be inspected, a time period during which traffic is to be inspected, a particular event that may trigger inspection when detected by the proxy device, or the like.

As shown by reference number 110, the proxy device may determine an offload service based on the service information. The offload service may indicate the way in which processing of encrypted traffic of the secure session may bypass decryption by the proxy device and/or whether the encrypted traffic may be offloaded to hardware associated with the proxy device. Such offload services may include bypassing the encrypted traffic after a threshold amount of data has been inspected or after a specific period of time has elapsed, bypassing a particular type of message in the encrypted traffic, selectively bypassing encrypted traffic in one direction while continuing inspection in another direction (in the example of FIG. 1A, traffic inspection is bypassed in the S2C direction only), bypassing encrypted traffic in any or either direction until the proxy device detects a particular event, bypassing all encrypted traffic, or the like.

In some implementations, the proxy device may identify the offload service based on service information associated with multiple security services. For example, the proxy device may identify a level of access to the encrypted traffic that is needed by each security service. Here, the proxy device may identify the offload service based on such information. In such a case, a security service that needs a higher level access than another security service may govern the offload service that is identified by proxy device 230. A detailed example of determination of the offload service is described below with regard to FIG. 5.

In some implementations, the proxy device may store information associated with the offload service. The information stored by proxy device may include, for example, a description of the manner in which encrypted traffic is to be bypassed for decryption and re-encryption, information that identifies the secure session, information that identifies the client device and the server device, information that identifies a threshold amount of encrypted traffic to inspect in both or either directions (C2S or S2C), or the like.

As shown in FIG. 1B, and by reference number 115, the client device may send encrypted traffic destined for the server device (e.g., in the C2S direction) during the secure session. As shown by reference number 120, the proxy device determines information associated with the offload service for this secure session (i.e., the offload service to apply to the encrypted traffic). Here, the proxy device determines that encrypted traffic is to bypass inspection in the S2C direction (i.e., that C2S traffic is to be inspected), and the proxy device, at reference number 125, decrypts the encrypted traffic for inspection by one or more security services. As shown by reference number 130, after inspection of the traffic, the proxy device may re-encrypt the traffic. As shown by reference number 135, the proxy device forwards the re-encrypted traffic to the server device associated with the secure session.

As shown in FIG. 1C, and by reference number 140, the server device provides encrypted traffic of the secure session in the S2C direction. As shown by reference number 145, the proxy device determines the information associated with the offload service to be applied to the encrypted traffic associated with the secure session. Here, as shown by reference number 150, the proxy device determines that encrypted traffic is to bypass inspection in the S2C direction, and the proxy device does not decrypt the encrypted traffic travelling in the S2C direction (e.g., since the encrypted traffic will not be inspected by the one or more security services). As shown by reference number 155, the proxy device then forwards the bypassed encrypted traffic to the client device.

The above descriptions indicate that the granular offloading of a secure session by the proxy device may provide for more efficient usage of processor resources and/or a reduced amount of resource expenditures (e.g., as compared to a proxy device that does not perform granular offloading).

Based on service information associated with one or more security services, a proxy device may not need to apply all security services. As such, the proxy device may selectively offload and/or bypass traffic based on direction, data quantity or type, or temporal characteristics. Overall, the granular offloading technique will not compromise the efficacy of various security services and may increase throughput of a secure session, approaching or equaling a line rate.

As indicated above, FIG. 1A-1C are provided merely as examples. Other examples are possible and may differ from what was described with regard to FIG. 1A-1C. For example, while FIG. 1A-1C are described in the context of proxy device 230 hosting the one or more security services, in some implementations, the proxy device may perform operations, as described herein, and communicate with a security device and/or system that is to perform the security services.

Figure 2:
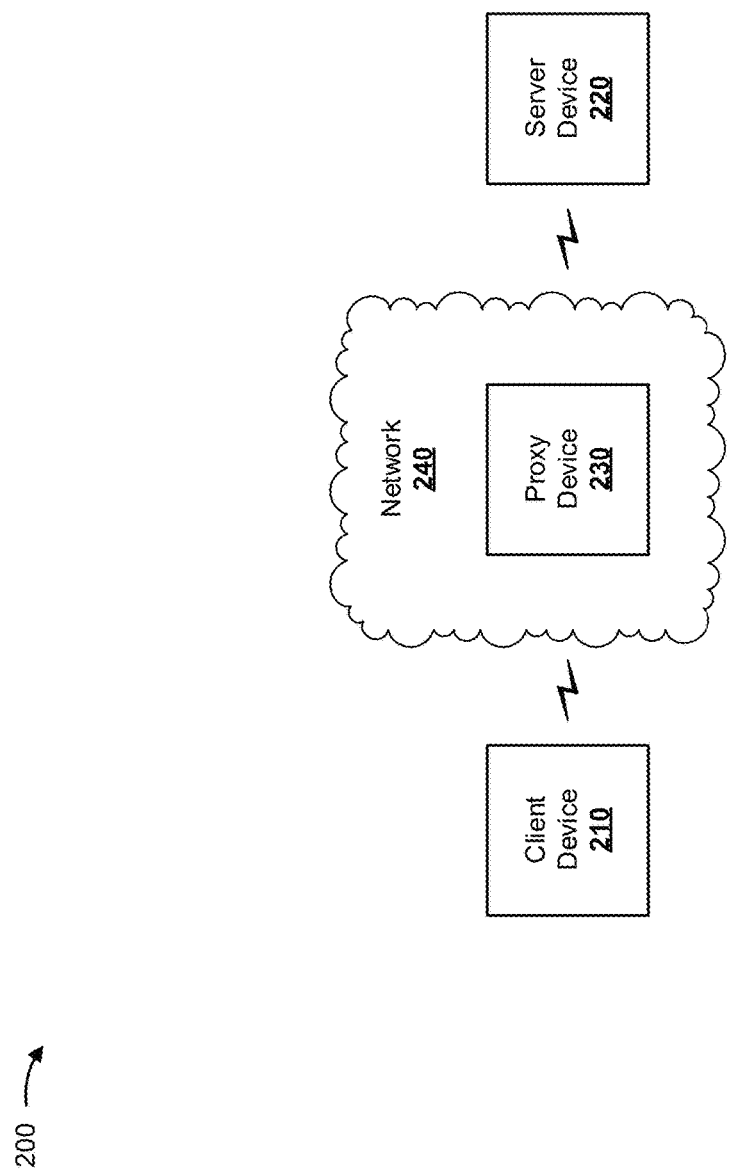
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a proxy device 230, and a network 240. Devices of environment 200 may interconnect via wired connections, wireless connections, or a combination of wired and wireless connections.

Client device 210 includes one or more devices capable of communicating with server device 220 via a secure session associated with server device 220 and client device 210. For example, client device 210 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), or a similar device. In some implementations, client device 210 may be capable of receiving, storing, processing, and/or providing traffic via the secure session associated with server device 220.

Server device 220 includes one or more devices capable communicating with client device 210 via a secure session associated with server device 220 and client device 210. For example, server device 220 may include a server or a group of servers. In some implementations, server device 220 may be capable of receiving, storing, processing, and/or providing traffic via the secure session associated with client device 210.

Proxy device 230 includes one or more devices capable of acting as a proxy device for a secure session, associated with client device 210 and server device 220, and applying one or more security services to encrypted traffic associated with the secure session. For example, in some implementations, proxy device 230 includes a device capable of decrypting, encrypting, inspecting, processing, forwarding, and/or transferring traffic associated with the secure session between client device 210 and server device 220. For example, proxy device 230 may include a router (e.g., a label switching router (LSR), a label edge router (LER), an ingress router, an egress router, a provider router, etc.), a gateway, a switch, a firewall, a hub, a bridge, a reverse proxy, a server (e.g., a proxy server), a security device, an intrusion detection device, a load balancer, or any traffic transfer device.

In some implementations, proxy device 230 may host the one or more security services (e.g., such that proxy device 230 may apply the one or more security services). Additionally, or alternatively, proxy device 230 may be communicatively connected to a security device and/or system that is capable of applying the one or more security services.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
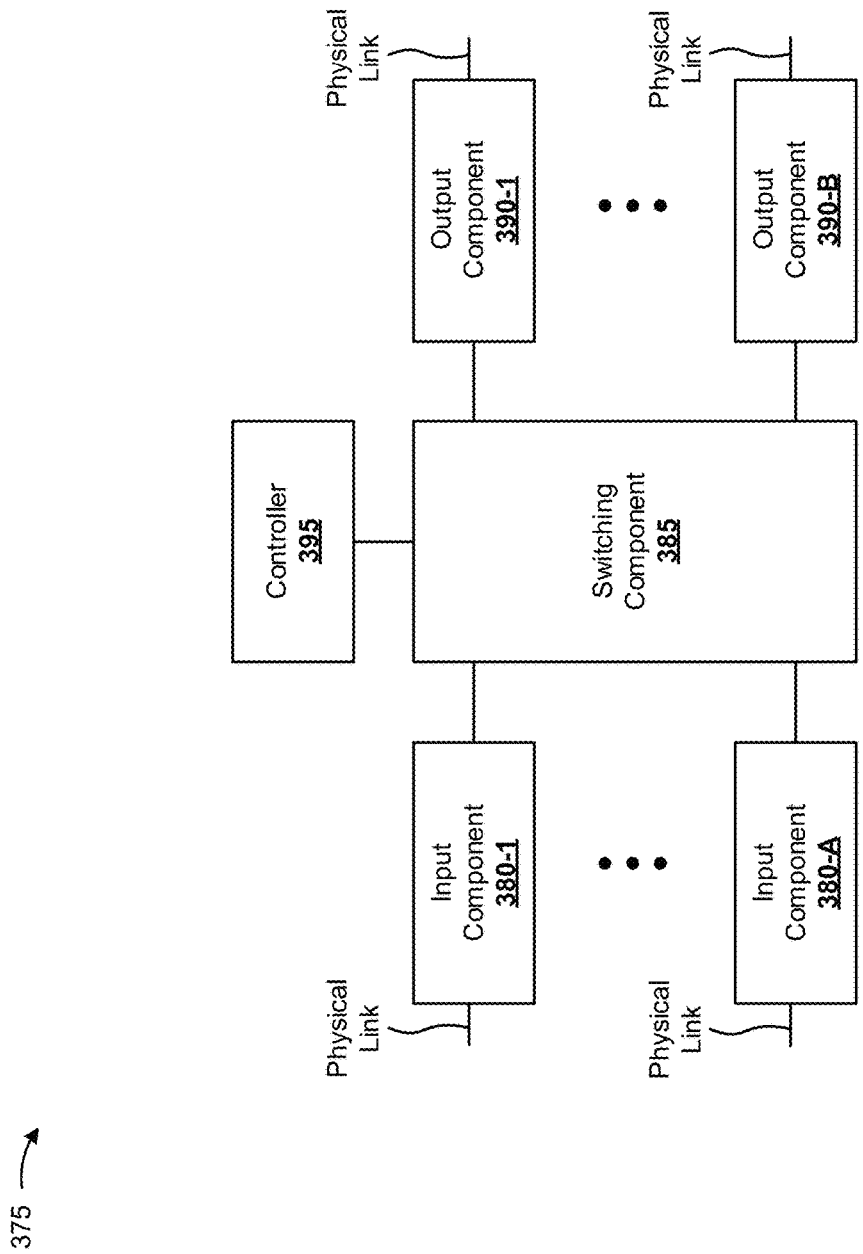
FIG. 3 is a diagram of example components of one or more devices of FIG. 2.

FIG. 3 is a diagram of example components of a device 375. Device 375 may correspond to proxy device 230. In some implementations, proxy device 230 may include one or more devices 375 and/or one or more components of device 375. As shown in FIG. 3, device 375 may include one or more input components 380-1 through 380-A (A≥1) (hereinafter referred to collectively as input components 380, and individually as input component 380), a switching component 385, one or more output components 390-1 through 390-B (B≥1) (hereinafter referred to collectively as output components 390, and individually as output component 390), and a controller 395.

Input component 380 may be points of attachment for physical links and may be points of entry for incoming traffic, such as packets. Input component 380 may process incoming traffic, such as by performing data link layer encapsulation or decapsulation. In some implementations, input component 380 may send and/or receive packets. In some implementations, input component 380 may include an input line card that includes one or more packet processing components (e.g., in the form of integrated circuits), such as one or more interface cards (IFCs), packet forwarding components, line card controller components, input ports, processors, memories, and/or input queues. In some implementations, device 375 may include one or more input components 380.

Switching component 385 may interconnect input components 380 with output components 390. In some implementations, switching component 385 may be implemented via one or more crossbars, via busses, and/or with shared memories. The shared memories may act as temporary buffers to store packets from input components 380 before the packets are eventually scheduled for delivery to output components 390. In some implementations, switching component 385 may enable input components 380, output components 390, and/or controller 395 to communicate.

Output component 390 may store packets and may schedule packets for transmission on output physical links. Output component 390 may support data link layer encapsulation or decapsulation, and/or a variety of higher-level protocols. In some implementations, output component 390 may send packets and/or receive packets. In some implementations, output component 390 may include an output line card that includes one or more packet processing components (e.g., in the form of integrated circuits), such as one or more IFCs, packet forwarding components, line card controller components, output ports, processors, memories, and/or output queues. In some implementations, device 375 may include one or more output components 390. In some implementations, input component 380 and output component 390 may be implemented by the same set of components (e.g., and input/output component may be a combination of input component 380 and output component 390).

Controller 395 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 395 may include one or more processors that can be programmed to perform a function.

In some implementations, controller 395 may include a random access memory (RAM), a read only memory (ROM), and/or another type of dynamic or static storage device (e.g., a flash memory, a magnetic memory, an optical memory, etc.) that stores information and/or instructions for use by controller 395.

In some implementations, controller 395 may communicate with other devices, networks, and/or systems connected to device 375 to exchange information regarding network topology. Controller 395 may create routing tables based on the network topology information, create forwarding tables based on the routing tables, and forward the forwarding tables to input components 380 and/or output components 390. Input components 380 and/or output components 390 may use the forwarding tables to perform route lookups for incoming and/or outgoing packets.

Controller 395 may perform one or more processes described herein. Controller 395 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 395 from another computer-readable medium or from another device via a communication interface. When executed, software instructions stored in a memory and/or storage component associated with controller 395 may cause controller 395 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 375 may include additional components, fewer components, different components, or differently arranged components than those shown in FIG. 3. Additionally, or alternatively, a set of components (e.g., one or more components) of device 375 may perform one or more functions described as being performed by another set of components of device 375.

Figure 4:
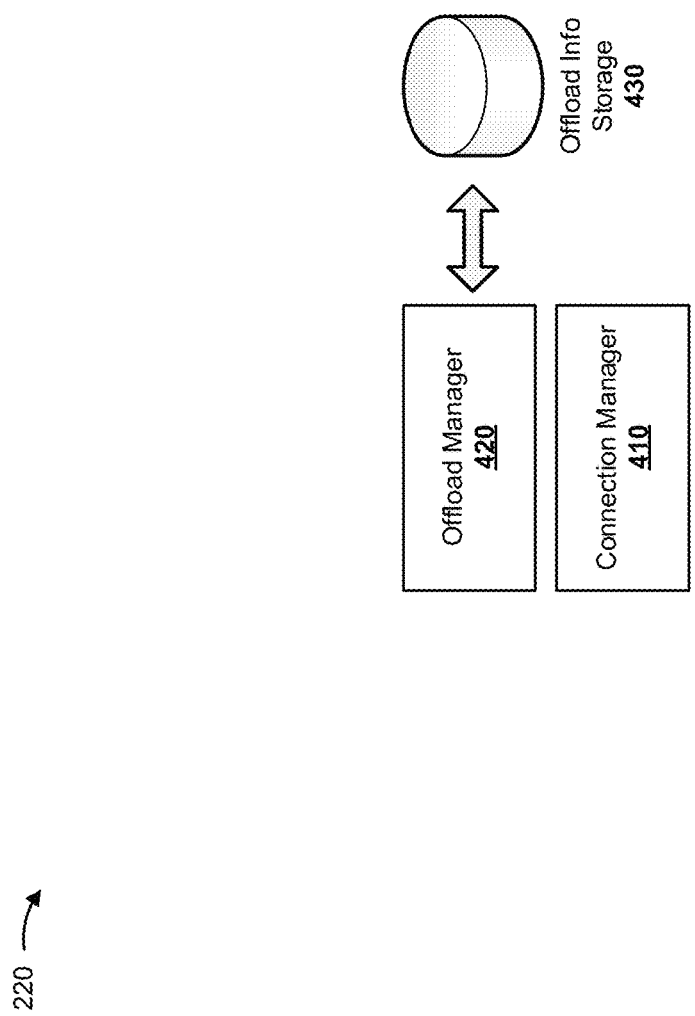
FIG. 4 is a diagram of example functional elements of the proxy device of FIG. 2.

FIG. 4 is a diagram of example functional elements of proxy device 230. As shown in FIG. 4, proxy device 230 may include a connection manager 410, an offload manager 420, and an offload information storage 430. In some implementations, connection manager 410, offload manager 420, and offload information storage 430 are implemented in software that is executed on hardware, such as by a processor, implemented in firmware, or implemented in hardware.

Connection manager 410 may perform operations associated with establishing a secure session between client device 210 and proxy device 230 and/or a secure session between proxy device 230 and server device 220. For example, in some implementations, connection manager 410 may negotiate parameters for a secure session between client device 210 and proxy device 230 and/or a secure session between proxy device 230 and server device 220. In some implementations, connection manager 410 may negotiate these parameters in such way that the two secure sessions may be spliced or bridged together when the secure sessions are offloaded (e.g., to a hardware component of proxy device 230).

In some implementations, connection manager 410 may negotiate the parameters, associated with the secure sessions, and/or a type of key exchange to be used for the secure sessions based on information (e.g., security parameters) received from client device 210 (e.g., in a client hello message) and/or based on hardware capabilities of proxy device 230.

For example, if proxy device 230 is virtualized (i.e., software-based) and a type of key exchange, associated with the secure sessions, supports common key generation (e.g., an RSA key exchange), then connection manager 410 may attempt to cause a common (i.e., same) master secret and identical session keys to be generated for the secure session between client device 210 and proxy device 230 and the secure session between proxy device 230 and server device 220. In some implementations, identical keys in each secure session may obviate the need for proxy device 230 to re-encrypt a previously decrypted portion of traffic, permitting the original encrypted traffic to be forwarded by proxy device 230, thereby conserving processing resources of proxy device 230 and/or optimizing network communications.

In some implementations, as described above, connection manager 410 may cause a common master secret and identical session keys to be generated based on a type of key exchange associated with establishing the secure session, such as an RSA key exchange. In such a case, connection manager 410 may cause matching sets of parameters to be exchanged during establishment of the secure sessions (e.g., during TLS handshakes associated with the secure session), such as a random value generated by client device 210 (i.e., a client-random), a random value generated by server device 220 (i.e., a server-random), a pre-master secret generated by client device 210, or the like, as described below. This technique may be applicable to one or more versions of TLS protocol, such as TLS 1.1 and 1.2.

In some implementations, connection manager 410 may operate to ensure both secure sessions have a same set of security parameters and master secret in the following manner: proxy device 230 may receive a first client hello message from client device 210. The first client hello message includes a random value generated by client device 210 (e.g., client-random) and information that identifies a set of cipher suites supported by client device 210. Here, proxy device 230 determines the client-random and the information that identifies the set of supported cipher suites, generates a second client hello message including the same information, and sends the second client hello message to server device 220.

After receiving the second client hello message, server device 220 may respond with a first server hello message. The first server hello message may include a random value generated by server device 220 (e.g., server-random) and information that identifies a cipher suite, of the set of cipher suites supported by client device 210, that has been selected by server device 220. Server device 220 may also send a certificate associated with authenticating server device 220. Upon receiving the first server hello message, proxy device 230 may determine the server-random and the information that identifies the selected cipher suite, and generate a second server hello message including the same information. Proxy device 230 may send the second server hello message to client device 210. Proxy device 230 may also determine whether the server certificate is valid and, if so, may send a certificate, associated with proxy device 230, to client device 210 (e.g., rather than the certificate associated with server device 220).

Upon receiving the second server hello message and the proxy certificate, client device 210 may generate a pre-master secret (e.g., another random value) and encrypt the pre-master secret with a public key corresponding to the proxy certificate. Here, client device 210 may send the encrypted pre-master secret to proxy device 230.

Upon receiving the encrypted pre-master secret, proxy device 230 may decrypt (and store) the encrypted pre-master secret using a private key corresponding to the proxy certificate. Next, proxy device 230 may re-encrypt the pre-master secret with a public key corresponding to the server certificate, and send the re-encrypted pre-master secret to server device 220.

Upon receiving the re-encrypted pre-master secret, server device 220 may decrypt the re-encrypted pre-master secret using a private key corresponding to the server certificate. In this way, each of client device 210, server device 220, and proxy device 230 may have access to the same client-random, server-random, and pre-master secret.

Next, client device 210 may compute (e.g., based on the client-random, the server-random, and/or the pre-master secret) a master secret and a set of session keys. Client device 210 may then send a first notification (e.g., a change cipher spec notification) to proxy device 230 to indicate that client device 210 will start using the generated set of session keys for hashing and encrypting messages.

Upon receiving the first notification from client device 210, proxy device 230 may compute the master secret and the set of session keys. Proxy device 230 may then send a second notification (e.g., a change cipher spec notification) to server device 220 to indicate that proxy device 230 will start using the generated session keys for hashing and encrypting messages. Upon receiving the second notification, server device 220 may compute the master secret and the set of session keys.

Here, since identical information (e.g., client-random, server-random, and/or pre-master secret) is used by client device 210, server device 220, and proxy device 230 to compute the master secret and generate the session keys, the master secrets and sets of session keys generated by each device will be identical. The master secret and the set of session keys may then be used by client device 210, server device 220, and proxy device 230 to exchange encrypted traffic associated with the secure session.

Alternatively, if proxy device 230 is virtualized (i.e., software-based) and a type of key exchange, associated with the secure sessions, does not support common key generation (e.g., a Diffie-Hellman key exchange), then connection manager 410 may disable offloading for the secure session between client device 210 and proxy device 230 and the secure session between proxy device 230 and server device 220 (i.e., proxy device 230 may process the traffic in the typical manner).

Alternatively, if a hardware component capable of and/or dedicated to performing cryptographic operations (herein referred to as a crypto hardware accelerator) is available on proxy device 230, and a type of key exchange, associated with the secure sessions, supports common key generation (e.g., an RSA key exchange), then connection manager 410 may attempt to cause a common (i.e., same) master secret and identical session keys to be generated for the secure session between client device 210 and proxy device 230 and the secure session between proxy device 230 and server device 220, as described above.

Alternatively, if a crypto hardware accelerator is available on proxy device 230, and a type of key exchange, associated with the secure sessions, does not support common key generation (e.g., a Diffie-Hellman key exchange), then connection manager 410 may negotiate two different secure sessions with different master keys. Here, connection manager 410 may offload the secure sessions to the crypto hardware accelerator to perform decryption of the traffic and re-encryption of the traffic (e.g., after application of services and before forwarding). This technique may be applicable to one or more versions of SSL and/or TLS protocol, such as TLS 1.0 onwards (e.g., TLS 1.1, TLS 1.2, TLS 1.3, or the like).

Offload manager 420 may perform operations associated with managing requests by security services for inspection of encrypted traffic associated with a secure session. For example, offload manager 420 may receive one or more requests associated with applying one or more security services to encrypted traffic of a secure session, identify an offload service to be applied to encrypted traffic, and store (e.g., in offload information storage 430) information associated with the offload service. Additionally, or alternatively, offload manager 420 may perform operations associated with dynamically offloading encrypted traffic associated with a secure session. For example, offload manager 420 may receive encrypted traffic associated with a secure session, determine information associated with the offload service to be applied to the encrypted traffic, and apply the offload service to the encrypted traffic and/or cause the offload service to be applied to the encrypted traffic, as described below.

Offload information storage 430 may receive, store, and/or provide information associated with one or more security services to be applied to encrypted traffic associated with a secure session, and/or information associated with an offload service to be applied to the encrypted traffic of the secure session. Offload information storage 430 may, for example, store information that identifies the offload service to be applied to the secure session, information associated with the offload service, such as information that identifies an amount of data to be bypassed without inspection in a given direction (C2S, S2C, both C2S and S2C), information associated with one or more security services to be applied to the secure session, or the like. In some implementations, the information associated with the one or more security services may include information that identifies the security service, information associated with a decryption requirement of the security service, or the like. Further, in some implementations, offload information storage 430 may communicate with offload manager 420 in order to store and/or provide information associated with the one or more security services and/or the information associated with the offload service.

The number and arrangement of functional elements shown in FIG. 4 are provided as an example. In practice, proxy device 230 may include additional functional elements, fewer functional elements, different functional elements, or differently arranged functional elements than those shown in FIG. 4. Additionally, or alternatively, a set of functional elements (e.g., one or more functional elements) of proxy device 230 may perform one or more functions described as being performed by another set of functional elements of proxy device 230.

FIG. 5 is a flow chart of an example process 500 for identifying an offload service to be applied to encrypted traffic associated with a secure session. In some implementations, one or more process blocks of FIG. 5 may be performed by proxy device 230. In some implementations, one or more process blocks of FIG. 5 may be performed by another device or a group of devices separate from or including proxy device 230, such as client device 210 and/or server device 220.

As shown in FIG. 5, process 500 may include determining service information associated with a security service to be applied to encrypted traffic associated with a secure session (block 510). Security services, such as an intrusion detection service (IDS), a unified threat management (UTM) service, an intrusion prevention system (IPS) service, or the like, may have differing requirements for decryption of encrypted traffic in order to perform their associated security services. For instance, a URL filtering solution and/or an IDS may require that encrypted traffic travelling in one direction only (e.g., the C2S direction) be decrypted for inspection. An IDS and/or a deep packet inspection (DPI) service may need to inspect traffic in both C2S and S2C directions for a period of time (e.g., a threshold amount of time, until a threshold amount of data has been transmitted in the secure session, or the like). In some implementations, once an application has been identified by the security service, the service may not inspect any additional encrypted traffic. In such a case, offload manager 420 may dynamically adjust decryption of the encrypted traffic in accordance with the requirement (as described below).

The service information may include information associated with a level of access to encrypted traffic that is needed by a security service in order to apply the security service. For example, the service information may include information that identifies the security service, such as a security service name, a security service type, a security service identifier, or the like. As another example, the service information may include information that identifies a type of data to be inspected by the security service, such as data messages only, control messages only, both data and control messages, all message types, or the like. As another example, the service information may include information that identifies a direction of encrypted traffic to be inspected by the security service, such as C2S only, S2C only, both C2S and S2C.

As still another example, the service information may include information that identifies a time period during which the security service is to inspect traffic (e.g., one minute, 10 minutes, as long as the session exists, or the like). As another example, the service information may include information that identifies an amount of data to be inspected by the security service, such as a first megabyte (MB), a first 10 MB, every fifth MB, a particular number of messages, or the like. As yet another example, the service information may include information that identifies a particular event that, when detected by proxy device 230, triggers inspection by the security service (e.g., renegotiation of a secure session).

In some implementations, proxy device 230 may determine service information associated with one or more security services to be applied to the encrypted traffic (e.g., when one or more security services are configured to inspect encrypted traffic of a given secure session).

In some implementations, proxy device 230 may determine the service information during establishment of the secure session. For example, during establishment of the secure session, one or more security services (e.g., hosted by proxy device 230 or hosted by a device in communication with proxy device 230) may register with offload manager 420 and provide the service information during such registration (e.g., in order to identify a level of access to encrypted traffic needed by the one or more security services). In some implementations, the one or more security services may register with offload manager 420 automatically (e.g., based on a configuration of the one or more security services) and/or based on a request from client device 210 and/or server device 220 (e.g., when client device 210 and/or server device 220 are configured to request one or more security services upon establishment of a secure session).

In some implementations, proxy device 230 may receive information associated with the one or more security services and may identify one or more suitable and/or possible offload services to be applied to the encrypted traffic associated with the secure session, described below with regard to block 520.

In some implementations, proxy device 230 may associate the service information with a session identifier, corresponding to the secure session, and may store the service information and the associated session identifier (e.g., in offload information storage 430). As such, proxy device 230 may identify service information associated with one or more security services, associated with the secure session, based on the session identifier at a later time.

As further shown in FIG. 5, process 500 may include identifying, based on the service information, an offload service to be applied to the encrypted traffic (block 520). In some implementations, proxy device 230 may identify the offload service when proxy device 230 receives the service information.

The offload service may include a manner in which processing of the encrypted traffic, associated with the secure session, may bypass decryption by proxy device 230 and/or be offloaded (e.g., to hardware associated with proxy device 230). Bypassing inspection saves processing resources of proxy device 230 by not requiring decryption of the encrypted traffic, while offloading to hardware of proxy device 230 saves processing resources by utilizing hardware dedicated to processing and/or forwarding traffic (e.g., rather than processing resources associated with inspecting encrypted traffic).

For example, the offload service may include bypassing (e.g., forwarding without decrypting, inspecting, and re-encrypting) the encrypted traffic after a threshold amount of traffic (e.g., 5 MB, a particular number of messages, or the like) has been inspected, after a threshold amount of time (e.g., 30 seconds, five minutes, etc.), or the like. Such bypassing saves processor resources of proxy device 230 by ceasing inspection after the threshold amount of traffic has been inspected or after the threshold amount of time has lapsed.

As another example, the offload service may include bypassing a particular type of message included in the encrypted traffic (e.g., a response to an HTTP request). Such bypassing saves processor resources of proxy device 230 by not requiring inspection of some encrypted traffic.

As still another example, the offload service may include bypassing a first type of encrypted traffic (e.g., data messages) travelling in a particular direction, while continuing to inspect a second type of encrypted traffic (e.g., control messages, such as handshake messages, or the like) travelling in the particular direction. Such bypassing saves processor resources of proxy device 230 by not requiring inspection of some encrypted traffic.

As another example, the offload service may include bypassing encrypted traffic, travelling in any direction, until proxy device 230 detects a particular event (e.g., a renegotiation of the secure session). Such bypassing saves processor resources of proxy device 230 by not requiring inspection of some encrypted traffic. As yet another example, the offload service may include bypassing inspection of all of the encrypted traffic (e.g., when the security service finishes inspecting the secure session according to a configuration of the security service). Such bypassing saves processor resources of proxy device 230 by not requiring inspection of any encrypted traffic.

In some implementations, proxy device 230 may identify the offload service based on service information associated with the security service. For example, proxy device 230 may identify the offload service by first determining whether any of the one or more security services is to inspect all encrypted traffic of the secure session. If a security service is to inspect all encrypted traffic, then no offloading of the encrypted traffic is permitted for the secure session. If no security service is to inspect all of the encrypted traffic, then proxy device 230 may determine whether any of the one or more of the security services is to inspect encrypted traffic of (e.g., of any type, of a particular type) in the C2S direction, and whether any of the one or more of the security services is to inspect encrypted traffic of (e.g., of any type, of a particular type) in the S2C direction.

If proxy device 230 determines that a security service is to inspect encrypted traffic in the C2S direction and that no security service is to inspect encrypted traffic in the S2C direction, then proxy device 230 may determine that the offload service includes inspecting encrypted traffic travelling in the C2S direction (e.g., all encrypted traffic, traffic of the particular type, or the like). In some implementations, the service information may identify a threshold amount of data to be inspected in the C2S direction, after which proxy device 230 may bypass traffic in the C2S direction. In this example, proxy device 230 may also determine that the offload service includes allowing encrypted traffic, travelling in the S2C direction, to be offloaded.

Alternatively, if proxy device 230 determines that a security service is to inspect encrypted traffic in the S2C direction and no security service is to inspect encrypted traffic in the C2S direction, then proxy device 230 may determine that the offload service includes inspecting encrypted traffic travelling in the S2C direction (e.g., all encrypted traffic, traffic of the particular type, or the like). In some implementations, the service information may identify a threshold amount of data to be inspected in the S2C direction, after which 230 may bypass traffic in the S2C direction. In this example, proxy device 230 may also determine that the offload service includes allowing encrypted traffic, travelling in the C2S direction, to be offloaded.

Alternatively, if proxy device 230 determines that a security service is to inspect encrypted traffic travelling in the C2S direction and that another security service is to inspect encrypted traffic in the S2C direction, then proxy device 230 may determine that the offload service includes inspecting encrypted traffic travelling in the C2S direction and the S2C direction (e.g., all encrypted traffic, traffic of the particular type, or the like). In some implementations, the service information may identify a threshold amount of data to be inspected in the C2S direction, after which 230 may bypass traffic in the C2S direction. Similarly, in some implementations, the service information may identify a threshold amount of data to be inspected in the S2C direction, after which 230 may bypass traffic in the S2C direction.

Alternatively, if proxy device 230 determines that no security service is to inspect the encrypted traffic in the C2S direction and no security service is to inspect encrypted traffic travelling in the S2C direction, then proxy device 230 may determine whether any of the one or more security services is to inspect encrypted traffic only upon detection of a particular event (e.g., renegotiation of the secure session). Here, if proxy device 230 determines that no security service is to inspect traffic upon detection of a particular event, proxy device 230 may determine that the offload service includes bypassing inspection of all of the encrypted traffic associated with the secure session. In this case, the secure session may be entirely offloaded to hardware of proxy device 230, such as an input/output component (IOC), a FPGA, or the like. However, if proxy device 230 determines that a security service is to inspect traffic upon detection of a particular event, then proxy device 230 may determine that the offload service includes bypassing inspection of the encrypted traffic (e.g., travelling in both the C2S direction and the S2C direction) until the particular event is detected (e.g., until a control message associated with renegotiation the secure session is received).

In some implementations, proxy device 230 may (e.g., automatically) identify the offload service during establishment of the secure session (e.g., based on the service information) or after establishment of the secure session (e.g., when proxy device 230 receives additional service information). Additionally, or alternatively, proxy device 230 may identify the offload service based on a request provided by client device 210 and/or server device 220.

Additionally, or alternatively, proxy device 230 may identify the offload service based on a change to the one or more security services. For example, when a particular security service leaves the secure session (e.g., is disabled, has finished inspecting encrypted traffic of the secure session, or the like) and/or changes a manner in which the security service is to inspect the encrypted traffic (e.g., when a threshold amount of data travelling in a particular direction has been inspected), proxy device 230 may re-identify the offload service (e.g., since the offload service may change based on the changes to the security service).

As further shown in FIG. 5, process 500 may include storing information associated with the offload service to be applied to the encrypted traffic (block 530). For example, proxy device 230 may store (e.g., in offload information storage 430) information associated with the offload service when proxy device 230 identifies the offload service.

The information associated with the offload service may include information that describes the manner in which encrypted traffic may bypass decryption and re-encryption by proxy device 230, information that identifies the secure session (e.g., a session identifier), information that identifies client device 210 and/or server device 220 (e.g., a network address), information that identifies a threshold amount of encrypted traffic to be inspected in one or both of the C2S and S2C directions, or the like.

In some implementations, proxy device 230 may store information associated with the offload service such that previous information associated with offloading encrypted traffic of the secure session, is overwritten or deleted.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for applying an offload service to encrypted traffic associated with a secure session. In some implementations, one or more process blocks of FIG. 6 may be performed by proxy device 230. In some implementations, one or more process blocks of FIG. 6 may be performed by another device or a group of devices separate from or including proxy device 230, such as client device 210 and/or server device 220.

As shown in FIG. 6, process 600 may include receiving encrypted traffic associated with a secure session (block 610). For example, proxy device 230 may receive the encrypted traffic when client device 210 provides the encrypted traffic associated with the secure session (e.g., in the C2S direction), and/or when server device 220 provides the encrypted traffic (e.g., in the S2C direction).

In some implementations, proxy device 230 may identify the encrypted traffic as being associated with the secure session based on information associated with the encrypted traffic (e.g., included in a packet header), such as a session identifier that identifies the secure session and/or information that identifies client device 210 and/or server device 220.

As further shown in FIG. 6, process 600 may include determining, based on the encrypted traffic, information associated with an offload service to be applied to the encrypted traffic (block 620). For example, proxy device 230 may determine the information associated with the offload service when proxy device 230 receives the encrypted traffic.

In some implementations, proxy device 230 may determine the information associated with the offload service based on information stored or accessible by proxy device 230, such as information associated with an offload service stored by proxy device 230 in the manner described above. For example, proxy device 230 may identify, based on the encrypted traffic, a secure session associated with the encrypted traffic. Here, proxy device 230 may determine, based on information that identifies the secure session and information stored by proxy device 230, the information associated with the offload service to be applied to the encrypted traffic.

As further shown in FIG. 6, process 600 may include applying the offload service to the encrypted traffic based on the information associated with the offload service (block 630). For example, proxy device 230 may apply the offload service to the encrypted traffic when proxy device 230 determines the information associated with the offload service.

In some implementations, proxy device 230 may apply the offload service in accordance with the information associated with the offload service. For example, if the offload service indicates that no offloading is permitted for the secure session, proxy device 230 may decrypt encrypted traffic for inspection by one or more security services. After inspection in this case, proxy device 230 may re-encrypt the traffic and forward the re-encrypted traffic, as needed.

In another example, if the offload service includes bypassing encrypted traffic travelling in the C2S direction after a threshold amount of data has been inspected in the C2S direction, and allowing traffic travelling in the S2C direction to be bypassed for inspection, then proxy device 230 may identify a direction of the encrypted traffic. Here, if the encrypted traffic is travelling in the S2C direction, proxy device 230 may bypass inspection (e.g., forward without decryption). Alternatively, if the encrypted traffic is travelling in the C2S direction, then proxy device 230 may determine, based on information associated with the offload service, whether the threshold amount of data has been inspected in the C2S direction. If the threshold amount of data has been inspected, then proxy device 230 may bypass inspection of the encrypted traffic. If the threshold amount of data has not been inspected, proxy device 230 may decrypt the encrypted traffic and re-encrypt the traffic after inspection (e.g., as described above). Here, proxy device 230 may update the information associated with the offload service to indicate a total amount of traffic that has been inspected in the C2S direction. In other words, proxy device 230 may track the amount of data inspected in the C2S direction so that proxy device 230 can determine when to begin bypassing inspection of the encrypted traffic.

As another example, if the offload service includes bypassing encrypted traffic travelling in the S2C direction after a threshold amount of data has been inspected in the S2C direction, and allowing encrypted traffic travelling in the C2S direction to bypass inspection, then proxy device 230 may identify a direction of the encrypted traffic. Here, if the encrypted traffic is travelling in the C2S direction, then proxy device 230 may bypass inspection of the encrypted traffic (i.e., forward without decrypting). Alternatively, if the encrypted traffic is travelling in the S2C direction, proxy device 230 may determine (e.g., based on the information associated with the offload service) whether the threshold amount of data has been inspected in the S2C direction. If the threshold amount of data has been inspected in the S2C direction, then proxy device 230 may bypass inspection of the encrypted traffic (i.e., forward without decrypting). If the threshold amount of data has not been inspected in the S2C direction, proxy device 230 may decrypt and re-encrypt the traffic as described above. In this example, proxy device 230 may update the information associated with the offload service to indicate a total amount of traffic that has been inspected in the S2C direction (i.e., 230 may track the amount of data inspected in the S2C direction so that proxy device 230 can determine when to begin bypassing inspection of the encrypted traffic).

As yet another example, if the offload service includes bypassing encrypted traffic travelling in the C2S direction after a first threshold amount of data has been inspected in the C2S direction, and bypassing encrypted traffic travelling in the S2C direction after a second threshold amount of data has been inspected in the S2C direction, then 230 may identify a direction of the encrypted traffic and proceed in the manner described above regarding determination of whether the first threshold and/or the second threshold have been satisfied.

As still another example, if the offload service includes bypassing inspection of all of the traffic associated with the secure session, then proxy device 230 may bypass inspection of the encrypted traffic (i.e., forward without decrypting) regardless of direction. Here, proxy device 230 may trigger offloading of the secure session to hardware of proxy device 230.

As another example, if the offload service includes bypassing inspection of the encrypted traffic in both the C2S direction and the S2C direction until the particular event is detected (e.g., until a control message associated with renegotiation the secure session is received), then proxy device 230 may determine whether the encrypted traffic has triggered the event, and proceed accordingly. For example, if the event to be detected is renegotiation of the secure session, then proxy device 230 may determine whether the traffic includes a control message (e.g., a handshake message) associated with renegotiating the secure session. If so, then proxy device 230 may decrypt the encrypted traffic for inspection by the one or more security services, as described above. If not, then proxy device 230 may bypass inspection of the encrypted traffic (e.g., without decrypting).

Although FIG. 6 shows example blocks of process 600, in some to, process 600 may include additional blocks, fewer blocks, different blocks, or differently arranged blocks than those depicted in FIG. 6. Additionally, or alternatively, two or more of the blocks of process 600 may be performed in parallel.

Implementations described herein provide a proxy device capable of dynamically offloading a secure session in a granular manner based on information associated with one or more security services to be applied to encrypted traffic of the secure session. Such offloading may allow for increased performance of the proxy device through more efficient use of processor resources and/or by reducing use of processor resources, without compromising efficacy of the one or more security services.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive encrypted traffic associated with a secure session;
determine, based on the encrypted traffic and before forwarding the encrypted traffic, information associated with an offload service to be applied to the encrypted traffic associated with the secure session,
the information associated with the offload service indicating whether the encrypted traffic is permitted to bypass inspection by one or more security services;
determine, based on the information associated with the offload service, whether a threshold amount of data has been inspected;
determine whether another threshold, associated with the secure session, has been satisfied,
the other threshold including a period of time during which the encrypted traffic, associated with the secure session, is to be inspected; and
selectively permit the encrypted traffic, associated with the secure session, to bypass inspection by the one or more security services based on whether the threshold amount of data has been inspected and based on whether the other threshold, associated with the secure session, has been satisfied.

2. The device of claim 1, where the one or more processors are further to:
determine service information associated with the one or more security services to be applied to the encrypted traffic associated with the secure session,
the service information identifying a manner in which the one or more security services need access to decrypted traffic, corresponding to the encrypted traffic, in order to apply the one or more security services; and
where the one or more processors, when determining the information associated with the offload service, are to:
determine the information associated with the offload service based on the service information associated with the one or more security services.

3. The device of claim 2, where the service information includes information that identifies at least one of:
a type of data to be inspected by the one or more security services;
a direction of encrypted traffic to be inspected by the one or more security services;
the period of time during which the one or more security services are to inspect the encrypted traffic;
an amount of data to be inspected by the one or more security services; or
a particular event that triggers inspection of the encrypted traffic by the one or more security services.

4. The device of claim 1, where the one or more processors are further to:
identify a direction of the encrypted traffic; and
where the one or more processors, when selectively permitting the encrypted traffic to bypass inspection by the one or more security services, are to:
selectively permit the encrypted traffic to bypass inspection by the one or more security services based on the direction of the encrypted traffic.

5. The device of claim 1, where the one or more processors are further to:
identify a type of a message included in the encrypted traffic; and where the one or more processors, when selectively permitting the encrypted traffic to bypass inspection by the one or more security services, are to:
selectively permit the encrypted to bypass inspection by the one or more security services based on the type of the message included in the encrypted traffic.

6. The device of claim 1, wherein the one or more processors are further to:
identify a level of access to the encrypted traffic that is needed by a security service of the one or more security services; and
identify the offload service based on the level of access.

7. A non-transitory computer-readable medium storing instructions,
the instructions comprising:
one or more instructions that, when executed by one or more processors, cause the one or more processors to:
receive encrypted traffic associated with a secure session;
identify, based on the encrypted traffic and before forwarding the encrypted traffic, an offload service to be applied to the encrypted traffic associated with the secure session,
the offload service indicating whether the encrypted traffic is permitted to be forwarded without inspection by one or more security services;
determine, based on the offload service indicating whether the encrypted traffic is permitted to be forwarded without inspection, whether a threshold amount of data has been inspected;
determine whether another threshold, associated with the secure session, has been satisfied,
the other threshold including a period of time during which the encrypted traffic, associated with the secure session, is to be inspected; and
selectively forward the encrypted traffic, without inspection by the one or more security services, based on one or more of whether the threshold amount of data has been inspected and based on whether the other threshold, associated with the secure session, has been satisfied.

8. The non-transitory computer-readable medium of claim 7, where the one or more instructions, when executed by the one or more processors, further cause the one or more processors to:
determine service information associated with the one or more security services,
the service information identifying at least one of:
a type of data to be inspected by the one or more security services,
a direction of encrypted traffic to be inspected by the one or more security services,
the period of time during which the one or more security services are to inspect the encrypted traffic,
an amount of data to be inspected by the one or more security services, or
a particular event that triggers inspection of the encrypted traffic by the one or more security services; and
where the one or more instructions, that cause the one or more processors to identify the offload service, cause the one or more processors to:
identify the offload service based on the service information associated with the one or more security services.

9. The non-transitory computer-readable medium of claim 7, where the one or more instructions, when executed by the one or more processors, further cause the one or more processors to:

identify a direction of the encrypted traffic; and
where the one or more instructions, that cause the one or more processors to selectively forward the encrypted traffic without inspection by the one or more security services, are to:
selectively forward the encrypted traffic without inspection by the one or more security services based on the direction of the encrypted traffic.

10. The non-transitory computer-readable medium of claim 7, where the one or more instructions, when executed by the one or more processors, further cause the one or more processors to:
identify a type of a message included in the encrypted traffic; and
where the one or more instructions, that cause the one or more processors to selectively forward the encrypted traffic without inspection by the one or more security services, are to:
selectively forward the encrypted traffic without inspection by the one or more security services based on the type of the message included in the encrypted traffic.

11. The non-transitory computer-readable medium of claim 7, where the offload service indicates that no security service is to inspect the encrypted traffic, and
where the one or more instructions, that cause the one or more processors to selectively forward the encrypted traffic without inspection by the one or more security services, are to:
offload processing or forwarding of the encrypted traffic to a hardware component of a proxy device.

12. The non-transitory computer-readable medium of claim 7, where the one or more instructions to identify the offload service cause the one or more processors to:
identify a level of access to the encrypted traffic that is needed by a security service of the one or more security services; and
identify the offload service based on the level of access.

13. A method, comprising:
determining, by a device, service information associated with one or more security services to be applied to encrypted traffic associated with a secure session,
the service information identifying a manner in which the one or more security services need to access the encrypted traffic in order to apply the one or more security services;
identifying, by the device, before forwarding the encrypted traffic, and based on the service information, an offload service to be applied to the encrypted traffic,
the offload service indicating whether the encrypted traffic is permitted to bypass inspection by the one or more security services;
receiving, by the device, the encrypted traffic associated with the secure session;
determining, by the device and based on the offload service indicating whether the encrypted traffic is permitted to bypass inspection, whether a threshold amount of data has been inspected;
determining, by the device, whether another threshold, associated with the secure session, has been satisfied,
the other threshold including a period of time during which the encrypted traffic, associated with the secure session, is to be inspected; and
selectively permitting, by the device and based on whether the threshold amount of data has been inspected and based on whether the other threshold, associated with the secure session, has been satisfied.

14. The method of claim 13, where the service information includes information that identifies at least one of:
- a type of data to be inspected by the one or more security services;
- a direction of encrypted traffic to be inspected by the one or more security services;
- the period of time during which the one or more security services are to inspect the encrypted traffic;
- an amount of data to be inspected by the one or more security services; or
- a particular event that triggers inspection of the encrypted traffic by the one or more security services.

15. The method of claim 13, further comprising:
identifying a direction of the encrypted traffic; and
where selectively permitting the encrypted traffic to bypass inspection by the one or more security services comprises:
selectively permitting the encrypted to bypass inspection by the one or more security services based on the direction of the encrypted traffic.

16. The method of claim 13, further comprising:
identifying a type of a message included in the encrypted traffic; and
where selectively permitting the encrypted traffic to bypass inspection by the one or more security services comprises:
selectively permitting the encrypted to bypass inspection by the one or more security services based on the type of the message included in the encrypted traffic.

17. The method of claim 13, further comprising:
causing a client device, associated with the secure session, and a server device, associated with the secure session, to generate a same master secret and a same set of session keys for the secure session.

18. The non-transitory computer-readable medium of claim 7, where the one or more instructions, when executed by the one or more processors, further cause the one or more processors to:
determine whether other encrypted traffic includes a control message; and
selectively permit the other encrypted traffic to be decrypted for inspection by the one or more security services when the encrypted traffic includes the control message.

19. The non-transitory computer-readable medium of claim 18, where the control message is associated with renegotiating a secure session.

20. The method of claim 13,
wherein the service information is associated with multiple security services, and
wherein the multiple security services include the one or more security services.

* * * * *